US009932134B2

(12) United States Patent
Suolahti et al.

(10) Patent No.: US 9,932,134 B2
(45) Date of Patent: Apr. 3, 2018

(54) METHOD AND APPARATUS FOR SETTING CORNER PROTECTORS ON A LOAD

(71) Applicant: Signode Industrial Group LLC, Glenview, IL (US)

(72) Inventors: Yrjo Suolahti, Mynaemaeki (FI); Janne Koskela, Turku (FI)

(73) Assignee: Signode Industrial Group LLC, Glenview, IL (US)

( * ) Notice: Subject to any disclaimer, the term of this patent is extended or adjusted under 35 U.S.C. 154(b) by 463 days.

(21) Appl. No.: 14/425,582

(22) PCT Filed: Sep. 6, 2013

(86) PCT No.: PCT/US2013/058602
§ 371 (c)(1),
(2) Date: Mar. 3, 2015

(87) PCT Pub. No.: WO2014/039887
PCT Pub. Date: Mar. 13, 2014

(65) Prior Publication Data
US 2015/0232214 A1    Aug. 20, 2015

(30) Foreign Application Priority Data
Sep. 7, 2012    (FI) .................................... 20125931

(51) Int. Cl.
*B65B 11/02* (2006.01)
*B65B 13/18* (2006.01)
*B25J 11/00* (2006.01)

(52) U.S. Cl.
CPC ............. *B65B 13/181* (2013.01); *B25J 11/00* (2013.01); *B65B 11/02* (2013.01)

(58) Field of Classification Search
USPC ....................................... 53/410; 414/222.09
See application file for complete search history.

(56) References Cited

U.S. PATENT DOCUMENTS 2,711,803 A    6/1955    Hurst et al.
2,745,688 A    5/1956    Farrington et al.
(Continued)

FOREIGN PATENT DOCUMENTS

CN    101 830 292    9/2010
DE    2256753    5/1974
(Continued)

OTHER PUBLICATIONS

International Search Report and Written Opinion for International Application No. PCT/US2013/058602 dated Nov. 20, 2013 (9 pages).

*Primary Examiner* — Michelle Lopez
*Assistant Examiner* — Chinyere Rushing-Tucker
(74) *Attorney, Agent, or Firm* — Neal, Gerber & Eisenberg LLP

(57) ABSTRACT

A method and a system for setting corner protectors on a load. In operation of one embodiment, an actuator retrieves a two corner protectors from a corner protector storage and provides the corner protectors to a corner protector transferring and setting system. The corner protector transferring and setting system transfers the corner protectors to a side of the load furthest from the actuator and sets the corner protectors against the two adjacent vertically extending corners of that side of the load. The actuator retrieves another two corner protectors from the corner protector storage and sets the two corner protectors against the two vertically extending corners of a side of the load closest to the actuator. A wrapping machine then wraps a film around the corner protectors and the load, thereby securing the corner protectors in place.

18 Claims, 1 Drawing Sheet

(56) References Cited

U.S. PATENT DOCUMENTS

| | | |
|---|---|---|
| 2,758,898 A | 8/1956 | Kobsch |
| 2,797,634 A | 7/1957 | Rueckert |
| 2,942,797 A | 6/1960 | Lorenz et al. |
| 3,016,869 A | 1/1962 | Anderson et al. |
| 3,190,457 A | 6/1965 | Linden |
| 3,278,059 A | 10/1966 | Ridgeway et al. |
| 3,436,046 A | 4/1969 | Valeska |
| 3,507,137 A | 4/1970 | Taleff et al. |
| 3,626,654 A | 12/1971 | Hoffler et al. |
| 3,679,244 A | 7/1972 | Reddy |
| 3,852,937 A | 12/1974 | Bitsura et al. |
| 3,902,303 A | 9/1975 | King |
| 3,944,045 A | 3/1976 | Higgins |
| 4,063,401 A | 12/1977 | Higgins |
| 4,067,174 A | 1/1978 | Goldstein |
| 4,204,377 A | 5/1980 | Lancaster et al. |
| 4,235,062 A | 11/1980 | Lancaster, III et al. |
| 4,317,322 A | 3/1982 | Lancaster et al. |
| 4,473,990 A | 10/1984 | Thimon |
| 4,587,796 A | 5/1986 | Haloila |
| 4,588,142 A | 5/1986 | Malzacher |
| 4,619,193 A | 10/1986 | Crew |
| 4,631,898 A | 12/1986 | Brambilla |
| 4,754,594 A | 7/1988 | Lancaster |
| 4,756,143 A | 7/1988 | Lancaster |
| 4,905,451 A | 3/1990 | Jaconelli et al. |
| 4,905,488 A | 3/1990 | Plitt |
| 4,914,891 A | 4/1990 | Suolahti |
| 4,939,989 A | 7/1990 | Zacharias |
| 5,107,657 A | 4/1992 | Diehl et al. |
| 5,140,795 A | 8/1992 | Steding |
| 5,154,382 A | 10/1992 | Hoshino |
| 5,195,297 A | 3/1993 | Lancaster et al. |
| 5,216,871 A | 6/1993 | Hannen |
| 5,226,280 A * | 7/1993 | Scherer ............ B65B 13/181 53/139.7 |
| 5,463,843 A | 11/1995 | Sharp |
| 5,596,863 A * | 1/1997 | Kasel ............... B65B 13/181 53/399 |
| 5,619,838 A | 4/1997 | Kasel |
| 5,623,808 A | 4/1997 | Franklin et al. |
| 6,032,439 A | 3/2000 | Birkenfeld et al. |
| 6,237,307 B1 | 5/2001 | Zentmyer et al. |
| 6,298,636 B1 | 10/2001 | Lachenmeier et al. |
| 6,470,654 B1 | 10/2002 | Lachenmeier et al. |
| 6,516,591 B1 | 2/2003 | Lancaster, III et al. |
| 6,539,690 B2 | 4/2003 | Alvarez |
| 6,619,872 B2 | 9/2003 | Crorey et al. |
| 6,622,620 B1 | 9/2003 | Byington |
| 6,865,865 B2 | 3/2005 | Hannen et al. |
| 6,945,163 B2 | 9/2005 | Squyres |
| 7,036,289 B2 | 5/2006 | Suolahti |
| 7,040,076 B2 | 5/2006 | Lachenmeier et al. |
| 7,213,381 B2 * | 5/2007 | Zitella ............... B65B 13/181 53/139.7 |
| 7,234,289 B2 | 6/2007 | Hannen et al. |
| 7,325,487 B2 | 2/2008 | Squyres |
| 7,367,740 B2 | 5/2008 | Lazic et al. |
| 7,533,515 B1 | 5/2009 | Koskela |
| 7,707,801 B2 | 5/2010 | Lancaster, III |
| 7,707,802 B2 | 5/2010 | Forrest |
| 7,908,831 B1 | 3/2011 | Dugan |
| 7,913,476 B2 | 3/2011 | Lachenmeier |
| 7,937,910 B2 | 5/2011 | Jaconelli et al. |
| 7,966,790 B2 | 6/2011 | Michels et al. |
| 7,975,456 B2 | 7/2011 | Lachenmeier et al. |
| 8,141,327 B2 | 3/2012 | Lancaster, III |
| 8,347,784 B2 | 1/2013 | Herrmann |
| 8,453,420 B2 | 6/2013 | Schmidt et al. |
| 8,875,480 B2 | 11/2014 | Czok |
| 2001/0046409 A1 | 11/2001 | Fischer |
| 2002/0033005 A1 | 3/2002 | Lachenmeier et al. |
| 2003/0156891 A1 | 8/2003 | Hung et al. |
| 2004/0107677 A1 | 6/2004 | Hannen et al. |
| 2004/0128949 A1* | 7/2004 | Lancaster, III ....... B65B 11/025 53/399 |
| 2004/0261360 A1* | 12/2004 | Cere ................... B65B 11/025 53/410 |
| 2006/0005511 A1 | 1/2006 | Suolahti et al. |
| 2006/0040085 A1 | 2/2006 | Downs et al. |
| 2006/0266002 A1* | 11/2006 | Zitella ............... B65B 13/181 53/139.7 |
| 2006/0285915 A1 | 12/2006 | Dellach et al. |
| 2007/0157557 A1 | 7/2007 | Lancaster, III |
| 2007/0163207 A1 | 7/2007 | Chiu Chen |
| 2009/0217624 A1 | 9/2009 | Forrest |
| 2009/0229226 A1 | 9/2009 | Beeland et al. |
| 2009/0293425 A1 | 12/2009 | Carter et al. |
| 2010/0018165 A1 | 1/2010 | Kudia |
| 2010/0071317 A1 | 3/2010 | Michels et al. |
| 2010/0163443 A1 | 7/2010 | Storig et al. |
| 2010/0258241 A1 | 10/2010 | Perecman |
| 2011/0258973 A1 | 10/2011 | Czok et al. |
| 2012/0055123 A1* | 3/2012 | Brunson ............ B65B 9/135 53/558 |
| 2014/0013714 A1 | 1/2014 | Lachenmeier et al. |
| 2014/0053502 A1 | 2/2014 | Pecchenini et al. |
| 2014/0137516 A1 | 5/2014 | Lachenmeier et al. |
| 2014/0217258 A1* | 8/2014 | Cere' ................ B65B 11/025 248/647 |
| 2014/0250831 A1 | 9/2014 | Suolahti et al. |

FOREIGN PATENT DOCUMENTS

| | | |
|---|---|---|
| DE | 3101310 | 12/1981 |
| DE | 3918311 | 12/1989 |
| DE | 3914595 | 11/1990 |
| DE | 20101909 | 6/2002 |
| DE | 102005037916 | 5/2006 |
| DE | 10 2005 062 609 | 7/2007 |
| DE | 20 2007 018 900 | 8/2009 |
| DE | 102010037770 | 6/2012 |
| DE | 10 2011 000 205 | 7/2012 |
| EP | 0 621 184 | 10/1994 |
| EP | 0 653 352 | 5/1995 |
| EP | 0 811 554 | 12/1997 |
| EP | 1 033 305 | 9/2000 |
| EP | 1 097 867 | 5/2001 |
| EP | 1 266 828 | 12/2002 |
| EP | 1 266 829 | 12/2002 |
| EP | 1 454 827 | 9/2004 |
| EP | 1 542 192 | 6/2005 |
| EP | 1 574 432 | 9/2005 |
| EP | 2 060 492 | 5/2009 |
| EP | 2 069 209 | 6/2009 |
| EP | 2 199 214 | 6/2010 |
| FI | 78433 | 4/1989 |
| FI | 91624 | 4/1994 |
| FR | 1 396 355 | 4/1965 |
| GB | 2 395 165 | 5/2004 |
| JP | 2002104308 | 4/2002 |
| JP | 2013154956 | 8/2013 |
| WO | 02/812065 | 2/2002 |
| WO | WO 2004/045952 | 6/2004 |
| WO | 2006/110596 | 10/2006 |
| WO | 2008/031449 | 3/2008 |
| WO | 2010/078915 | 7/2010 |
| WO | WO 2012/027705 | 3/2012 |

* cited by examiner

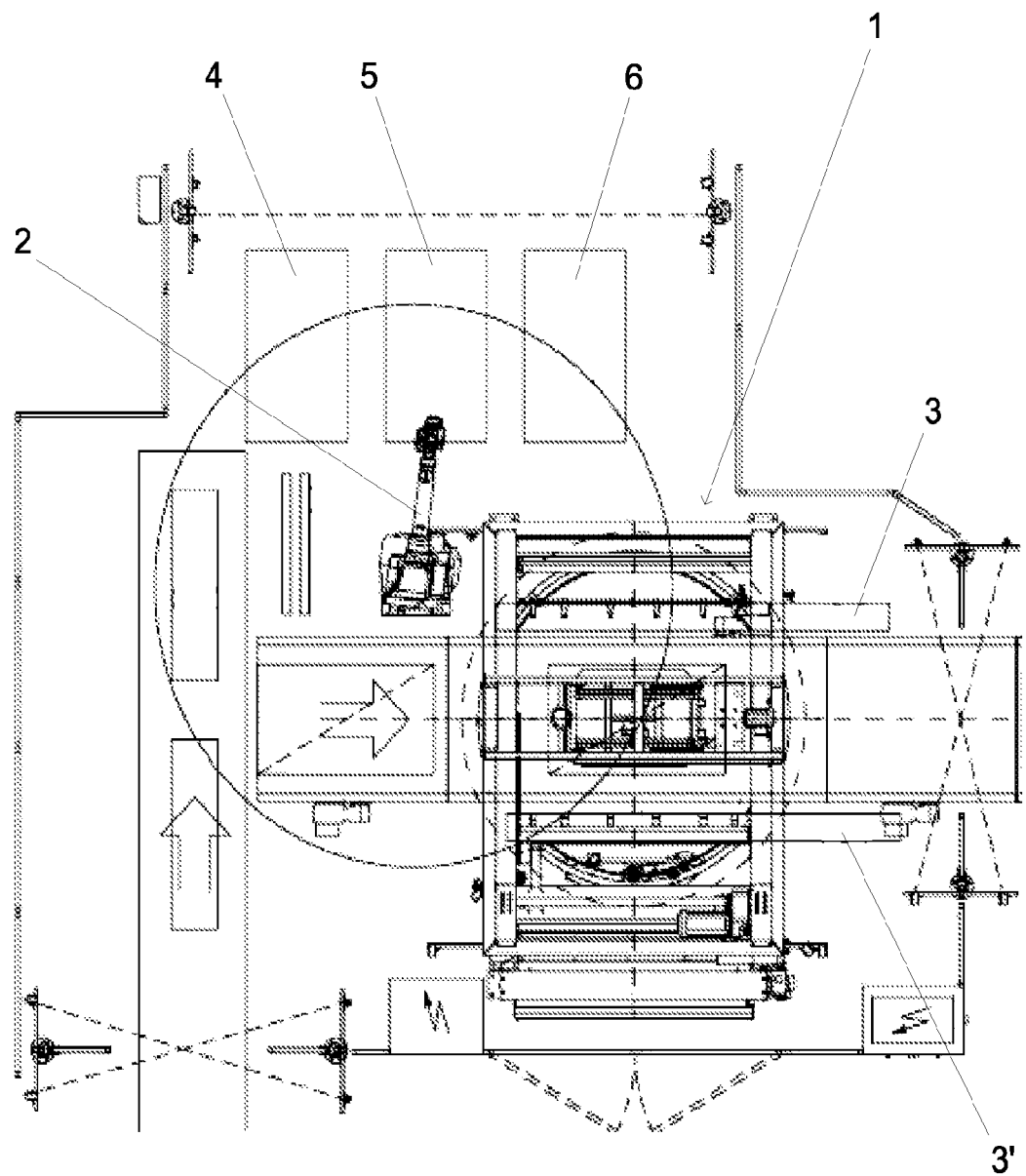

METHOD AND APPARATUS FOR SETTING CORNER PROTECTORS ON A LOAD

PRIORITY CLAIM

This application is a national stage entry of PCT/US2013/058602, filed on Sep. 6, 2013, which claims priority to and the benefit of Finland Patent Application No. 20125931, filed on Sep. 7, 2012, the entire contents of each of which are incorporated herein by reference.

FIELD

The present disclosure relates to the setting of corner protectors on a palletized load before or during wrapping of the load with film material. More precisely, the present disclosure relates to a method and a system for setting the corner protectors.

BACKGROUND

When different kinds of palletized loads and articles are wrapped in film material with wrapping machines, some loads and articles require corner protectors to be added on the corners of the load to further protect the wrapped load. The corner protectors are generally set on vertically extending corners of the palletized loads and articles to be wrapped usually before or during the wrapping process. This way the wrapped film secures and keeps the corner protectors in place.

The corner protectors are generally made of paper or paperboard material that is generally pre-folded so as to define a pair of surfaces that meet at an angle. The inner surfaces of the corner protectors are set against the load.

Certain known apparatuses for setting corner protectors on a load to be wrapped that are used with wrapping machines that do not rotate the load generally comprise in each corner area of the load one or more magazines for storing and supplying corner protectors, and a pick-up or transfer mechanism for removing a corner protector from the magazine and transferring the corner protector to the corner of the load. One example of this type of apparatus is disclosed in European Patent No. EP 1 033 305 B1.

International Application Publication No. WO/2012/027705 discloses a corner post application system, which comprises at each of the four corners of the load to be enveloped a swing arm, an application arm coupled to the swing arm, and a controller. The controller rotates the swing arm about a vertical pivot axis until a corner post held by a corner post gripper is aligned with adjacent sides that define a corner of the load. The controller thereafter stops rotation of the swing arm and moves the application arm linearly toward the corner of the load until the corner post comes in contact with adjacent sides of the load.

One problem with these prior art corner protector setting machines is that they require four separate arrangements, one for each corner of the palletized non-rotatable load, to set the corner protectors to each corner prior to or during the wrapping process. This makes these prior art machines complex and costly.

SUMMARY

The corner protector setting system of the present disclosure provides a simple and cost-effective arrangement for setting corner protectors to each of the four corners of a non-rotatable load prior to or during wrapping of the load.

Further, the corner protector setting system of the present disclosure enables use of several different lengths of corner protectors for different heights of loads. In the corner protector setting system of the present disclosure, the storages for the corner protectors are also located close to each other in the same area, which makes refilling the storages a much simpler and easier operation than in the prior art apparatuses.

In operation of the corner protector setting system of the present disclosure, two corner protectors are taken from the corner protector storage with an actuator comprising two gripper units, one for each corner protector taken from the storage, which then are given to a corner protector transfer and setting device by the actuator. The corner protector transfer and setting device transfers the first two corner protectors on the other side of a load and sets the first two corner posts against the two vertically extending corners of the load furthest away from the actuator. After giving the first two corner protectors to the corner protector transfer and setting device, the actuator takes another two corner protectors from the corner protector storage, and sets them against the two vertically extending corners of the load closest to the actuator.

After the corner protectors are set against the corners of the load, the wrapping machine wraps a layer of film around the non-rotatable load, which film secures the corner protectors in their places. Now the actuator and the corner protector transfer and setting device can release their hold on the corner protectors, and the wrapping machine can proceed to wrap the whole load.

In cases in which both of the two corner protectors taken from the corner protector storage have the same orientation and position, one of the two corner protectors needs to be turned to a proper orientation for the corner protector setting system to be able to properly set the corner protectors on adjacent vertically extending corners of the load. This turning or rotating is done advantageously by the actuator prior to giving the first pair of corner protectors to the corner protector transfer device and prior to setting the second pair of corner protectors against the corners of the load by the actuator. For turning or rotating the corner protector to proper orientation, the actuator advantageously takes hold of the corner protector or protectors in the lengthwise middle area of the protector, so that the protector is easily rotated to proper orientation for example by rotating the actuator or the gripping portion of the actuator.

In the corner protector setting system of the present disclosure, the corner protector transfer and setting device may consist of two separate corner protector transfer and setting units, each unit handling one corner protector and covering one corner of the load. Advantageously, these corner protector transfer and setting units are integrated in the structure of the wrapping machine.

The actuator used in the corner protector setting system of the present disclosure is advantageously a robot equipped with two gripper units.

In the corner protector setting system of the present disclosure, the corner protector storage advantageously comprises a plurality of corner protector magazines configured to store different types and lengths of corner protectors. Thus, the type and length of the corner protectors used can be easily changed between different loads to be wrapped.

BRIEF DESCRIPTION OF THE FIGURES

An example embodiment of the corner protector setting system of the present disclosure and its advantages are explained in greater detail below with reference to the accompanying drawing.

FIG. 1 shows a schematic top view of one embodiment of the corner protector setting system of the present disclosure.

DETAILED DESCRIPTION

Turning to FIG. 1, this example embodiment of the corner protector setting system is configured to set corner protectors for a load to be wrapped in film by a ring type of wrapping machine 1. The corner protector setting system includes an actuator in form of a robot 2, two corner protector transferring and setting units 3 and 3' integrated in the structure of the wrapping machine 1, and corner protector storage comprising three corner protector magazines 4, 5, and 6.

In operation of this example embodiment of the corner protector setting system, the load is first moved into a wrapping area of the wrapping machine 1 with a conveyor line passing through the wrapping machine, for example.

After the load is positioned within the wrapping area of the wrapping machine 1, the robot 2, which is equipped with two gripper units (not shown), takes a first two corner protectors (not shown), one with each gripper unit, from one of the corner protector magazines 4, 5, and 6, and gives the first two corner protectors to the two corner protector transferring and setting units 3 and 3'.

Before the robot 2 gives the first two corner protectors to the corner protector transferring and setting units 3 and 3', the robot 2 rotates one of the first two corner protectors, such as around a horizontal axis, so that the two corner protectors are each in a suitable orientation to be set against two adjacent vertically extending corners of the load.

The two corner protector transferring and setting units 3 and 3' transfer the first two corner protectors around or over the load in suitable orientations, and set the corner protectors against the two adjacent vertically extending corners of the load furthest away from the robot 2.

The corner protector transferring and setting units 3 and 3' each comprise a gripping unit (not shown) configured to grip the corner protector handed to that transferring and setting unit by the robot 2. The gripping unit of each corner protector transferring and setting unit 3 and 3' is connected movably in a horizontally extending guide (not shown), which enables the gripping unit to move from one side of the load to opposite side of the load. The gripping unit of each corner protector transferring and setting unit 3 and 3' may also be rotatable and/or connected to the horizontally extending guide through a lengthwise adjustable arm. Thus, the corner protector can be turned to horizontal orientation when the corner protector is moved to other side of the load above the load and/or the corner protector can be moved sideways when the corner protector is moved to other side of the load in vertical orientation by the load.

Once the robot 2 has given the first two corner protectors to the corner protector transferring and setting units 3 and 3', the robot 2 immediately returns to retrieve a second two corner protectors from one of the corner protector magazines 4, 5, and 6. During the moving of the second two corner protectors to the load by the robot 2, the robot 2 rotates one of the second two corner protectors into a proper orientation to be set against the other corner of the load. After these actions, the robot 2 sets the second two corner protectors against the two vertically extending corners of the load closest to the robot 2. Since the robot 2 returned to retrieve the second two corner protectors from one of the corner protector magazines 4, 5, and 6 immediately after giving the first two corner protectors to the corner protector transfer and setting units 3 and 3', both the robot 2 and the corner protector transfer and setting units 3 and 3' set their respective corner protectors against the corners of the load substantially simultaneously.

When all four of the corner protectors are set against the respective corners of the load, the wrapping machine 1 wraps one round of film material around the load, after which the robot 2 and the corner protector transfer and setting units 3 and 3' release their holds on the corner protectors and the wrapping machine 1 proceeds to wrap the whole load. After releasing their holds from the corner protectors, the robot 2 and the corner protector transfer and setting units 3 and 3' return to their standby positions to wait for another load to equip with corner protectors.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for setting corner protectors on a load to be wrapped, said method comprising:
retrieving, via an actuator, a first pair of corner protectors from at least one corner protector storage unit positioned adjacent to the load;
providing, via the actuator, the first pair of corner protectors to a corner protector transfer and setting system;
after receiving the first pair of corner protectors from the actuator, transferring, via the corner protector transfer and setting system, the first pair of corner protectors to a first side of the load;
setting, via the corner protector transfer and setting system, the first pair of corner protectors against two corners of said first side of the load;
retrieving, via the same actuator, a second pair of corner protectors from the at least one corner protector storage unit; and
setting, via the actuator, the second pair of corner protectors against two corners of a second side of the load that is closer to the actuator than the first side of the load.

2. The method of claim 1, wherein the first side of the load is the side of the load furthest from the actuator and the second side of the load is the side of the load closest to the actuator.

3. The method of claim 1, wherein the corners are substantially vertically extending corners.

4. The method of claim 2, wherein the two corners of said first side of the load are the two corners of the load furthest from the actuator and the two corners of said second side of the load are the two corners of the load closest to the actuator.

5. The method of claim 1, which includes rotating, via the actuator, one of the first pair of corner protectors after retrieving said corner protector from the at least one corner protector storage unit and before providing said corner protector to the corner protector transfer and setting system.

6. The method of claim 1, which includes rotating, via the actuator, one of the second pair of corner protectors after retrieving said corner protector from the at least one corner protector storage unit and before setting said corner protector against one of the two corners of the second side of the load.

7. The method of claim 1, wherein the corner protector transfer and setting system includes separate first and second corner protector transfer and setting devices, and wherein:

providing the first pair of corner protectors to the corner protector transfer and setting system includes:
  providing, via the actuator, a first corner protector of the first pair to the first corner protector transfer and setting device; and
  providing, via the actuator, a second corner protector of the first pair to the second corner protector transfer and setting device;
transferring the first pair of corner protectors to the first side of the load includes:
  transferring, via the first corner protector transfer and setting device, the first corner protector of the first pair to the first side of the load; and
  transferring, via the second corner protector transfer and setting device, the second corner protector of the first pair to the first side of the load; and
setting the first pair of corner protectors against two corners of said first side of the load includes:
  setting, via the first corner protector transfer and setting device, the first corner protector of the first pair against a first of the two corners of said first side of the load; and
  setting, via the second corner protector transfer and setting device, the second corner protector of the first pair against a second of the two corners of said first side of the load.

8. The method of claim 1, which includes setting the first pair of corner protectors against the two corners of said first side of the load and setting, via the actuator, the second pair of corner protectors against the two corners of said second side of the load substantially simultaneously.

9. The method of claim 1, which includes, after setting the first and second pairs of corner protectors against their corresponding corners, wrapping, via a wrapping machine, a film around said corner protectors.

10. A corner protector setting system comprising:
an actuator; and
a corner protector transfer and setting system,
wherein the actuator is configured to: (a) retrieve a first pair of corner protectors from at least one corner protector storage unit positioned adjacent to a load and provide the first pair of corner protectors to the corner protector transfer and setting system; and (b) retrieve a second pair of corner protectors from the at least one corner protector storage unit and set the second pair of corner protectors against two corners of a second side of the load, and
wherein the corner protector transfer and setting system is configured to, after receiving the first pair of corner protectors, transfer the first pair of corner protectors to a first side of the load and set the first pair of corner protectors against two corners of said first side of the load, wherein the second side of the load is closer to the actuator than the first side of the load.

11. The corner protector setting system of claim 10, wherein the first side of the load is a side of the load furthest from the actuator and the second side of the load is a side of the load closest to the actuator.

12. The corner protector setting system of claim 10, wherein the corners are substantially vertically extending corners.

13. The corner protector setting system of claim 11, wherein the two corners of said first side of the load are the two corners of the load furthest from the actuator and the two corners of said second side of the load are the two corners of the load closest to the actuator.

14. The corner protector setting system of claim 10, wherein a portion of the actuator is rotatable such that the actuator is configured to rotate one of the first pair of corner protectors after retrieving said corner protector from the at least one corner protector storage unit.

15. The corner protector setting system of claim 10, wherein a portion of the actuator is rotatable such that the actuator is configured to rotate one of the second pair of corner protectors after retrieving said corner protector from the at least one corner protector storage unit.

16. The corner protector setting system of claim 10, wherein the corner protector transfer and setting system includes a first corner protector transfer and setting device and a separate second corner protector transfer and setting device.

17. The corner protector setting system of claim 16, wherein a portion of at least one of the first corner protector transfer and setting device and the second corner protector transfer and setting device is rotatable such that said portion of at least one of the first corner protector transfer and setting device and the second corner protector transfer and setting device is configured to rotate a corner protector received from the actuator.

18. The corner protector setting system of claim 16, wherein:
  the actuator is configured to provide a first corner protector of the first pair to the first corner protector transfer and setting device and a second corner protector of the first pair to the second corner protector transfer and setting device;
  the first corner protector transfer and setting device is configured to:
    transfer the first corner protector of the first pair to the first side of the load; and
    set the first corner protector of the first pair against a first of the two corners of said first side of the load; and
  the second corner protector transfer and setting device is configured to:
    transfer the second corner protector of the first pair to the first side of the load; and
    set the second corner protector of the first pair against a second of the two corners of said first side of the load.

* * * * *